United States Patent
Ding et al.

(10) Patent No.: US 12,072,233 B2
(45) Date of Patent: Aug. 27, 2024

(54) FIBER OPTIC SENSING FOR REDUCED FIELD WORK CONFLICTS

(71) Applicant: NEC Laboratories America, Inc., Princeton, NJ (US)

(72) Inventors: Yangmin Ding, East Brunswick, NJ (US); Yue Tian, Princeton, NJ (US); Sarper Ozharar, Princeton, NJ (US); Yuanda Xu, Jersey City, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 328 days.

(21) Appl. No.: 17/716,403

(22) Filed: Apr. 8, 2022

(65) Prior Publication Data

US 2022/0326070 A1 Oct. 13, 2022

Related U.S. Application Data (60) Provisional application No. 63/173,547, filed on Apr. 12, 2021.

(51) Int. Cl.
| | |
|---|---|
| *G01H 9/00* | (2006.01) |
| *G06N 3/04* | (2023.01) |
| *G06N 3/08* | (2023.01) |
| *G06N 20/20* | (2019.01) |
| *G06Q 50/06* | (2012.01) |

(52) U.S. Cl.
CPC ............ *G01H 9/004* (2013.01); *G06N 3/04* (2013.01); *G06N 3/08* (2013.01); *G06N 20/20* (2019.01); *G06Q 50/06* (2013.01)

(58) Field of Classification Search
CPC ............ G06N 3/04; G06N 3/08; G06N 20/20; G06Q 50/06
See application file for complete search history.

(56) References Cited

U.S. PATENT DOCUMENTS

| | | | | |
|---|---|---|---|---|
| 2021/0172767 A1* | 6/2021 | Yoda | ...................... | G01H 9/004 |
| 2024/0118127 A1* | 4/2024 | Iida | ...................... | G01M 11/088 |

FOREIGN PATENT DOCUMENTS

KR 20130130452 A * 12/2013 ............... H04N 7/18

OTHER PUBLICATIONS

Machine Translation of KR 20130130452 A (Year: 2013).*
Ho, Tin Kam. "Random decision forests." In Proceedings of 3rd international conference on document analysis and recognition, vol. 1, pp. 278-282. IEEE, 1995.

* cited by examiner

*Primary Examiner* — Nguyen Q. Ha
(74) *Attorney, Agent, or Firm* — Joseph Kolodka (57) ABSTRACT

Systems and methods for reducing work conflicts is provided. The method includes receiving a vibrational signal from a utility pole; identifying a location and type of field work on the utility pole from one or more features of the vibrational signal utilizing a trained neural network; and communicating the location and type of field work to a third party.

20 Claims, 8 Drawing Sheets

FIBER OPTIC SENSING FOR REDUCED FIELD WORK CONFLICTS

RELATED APPLICATION INFORMATION

This application claims priority to U.S. Provisional Application No. 63/173,547, filed on Apr. 12, 2021, and incorporated herein by reference in its entirety.

BACKGROUND

Technical Field

The present invention relates to detecting field work on utility poles and avoiding scheduling conflicts, and more particularly using distributed acoustic sensing in real time to avoid scheduling conflicting maintenance assignments on the same utility poles.

Description of the Related Art

A utility pole can be owned by either electric companies such as Public Service Electric and Gas Company (PSE&G), Atlantic City Electric, Direct Energy, etc., or a telecommunication company such as Verizon, AT&T, T-Mobile US, etc. In some cases, a utility pole can be owned by other third parties. In a normal situation, the field work on a utility pole can involve different parties. Thus, a field work scheduling conflict is usually unavoidable because neither party is notified of the other party's scheduled work. This can cause significant delays of the field work if not properly handled.

A fiber-optic cable can include one or more optical fibers that are used to carry light. Optical fiber can include a core and a cladding layer having different refractive indexes to provide for internal reflection.

SUMMARY

According to an aspect of the present invention, a method is provided for reducing work conflicts. The method includes receiving a vibrational signal from a utility pole; identifying a location and type of field work on the utility pole from one or more features of the vibrational signal utilizing a trained neural network; and communicating the location and type of field work to a third party.

According to another aspect of the present invention, a system is provided for reducing work conflicts. The system includes a distributed acoustic sensing (DAS) system, including a vibration sensing system configured to detect and measure dynamic strain changes along an optical fiber received as a vibrational signal from a utility pole, a trained neural network configured to identify a location and type of field work from one or more features of the vibrational signal, and a graphical user interface (GUI) configured to display the dynamic strain changes to a user as a vibrational pattern and communicate the location and type of field work to a third party.

According to another aspect of the present invention, a non-transitory computer readable storage medium comprising a computer readable program for reducing work conflicts is provided. The computer readable program when executed on a computer causes the computer to perform the steps of identifying a location and type of field work on at least one of a plurality of utility poles from one or more features of a received vibrational signal utilizing a trained neural network; and communicating the location and type of field work to a third party.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided for sensing vibrational signals in optical fibers of fiber optic cables strung along utility poles using neural networks. Detection of such vibrational signals can indicate that at least one utility company is working on the utility poles at a particular location, which could interfere with the work of other utility companies wishing to work on the same utility poles at that location.

In one or more embodiments, a distributed acoustic sensing (DAS) system can collect the real-time vibrational signals along optical fiber(s) caused by field work activity on utility poles. The DAS system can read the vibrations along the optical fibers that were previously strung along the utility poles for communications. Laying new optical fibers or other external sensors for sensing purposes is not required. In various embodiments, the vibration sensing system can sense/collect vibrations, temperature, and sounds up to a range of about 100 km with a resolution of about 50 cm. This means that the huge amount of optical fiber-based communication networks running throughout the nations can be used as sensors.

In one or more embodiments, the vibration sensing system can detect and measure dynamic strain changes along with the optical fiber by detecting the optical phase shifts of backscattered light relative to a local optical oscillator. When there is field work activity such as pole climbing, utility work, etc., the instantaneous vibrations caused by those field activities result in a time-varying phase shift, and therefore can be directly detected and localized by the distributed acoustic sensing (DAS) system.

In various embodiments, the working zone information can be presented to the parties via a Graphical user interface (GUI) which automates the representing and reporting process. The parties can access the information locally in the control room or remotely via mobile devices.

A utility pole can be owned by either an electric company, a telecommunication company, or in some cases a utility pole can be owned by other third parties. The involvement of multiple parties providing different utilities can lead to field work scheduling conflicts because each of the other parties may not be notified of the scheduled work of a first party. This can cause significant delays of the field work if not properly handled. For example, when the technicians from an electric company and a telecommunications company are sent out to the same location where field work required, then there can be a conflict between the two parties. For example, if a technician from an electric company or a pole inspection company is sent out before the repair work by a technician from a telecommunications company is completed, then those technicians may have to waste time waiting or turn back without completing their assignment. Knowing which company is performing the field work and when it is the correct time to send out the next technician from another party or same party thus reducing the conflict and improving work efficiency. The field work scheduling conflict between different companies can be remedied by introducing distributed fiber sensing technology and machine learning algorithms.

It is to be understood that aspects of the present invention will be described in terms of a given illustrative architecture; however, other architectures, structures, materials and process features and steps can be varied within the scope of aspects of the present invention.

Figure 1:
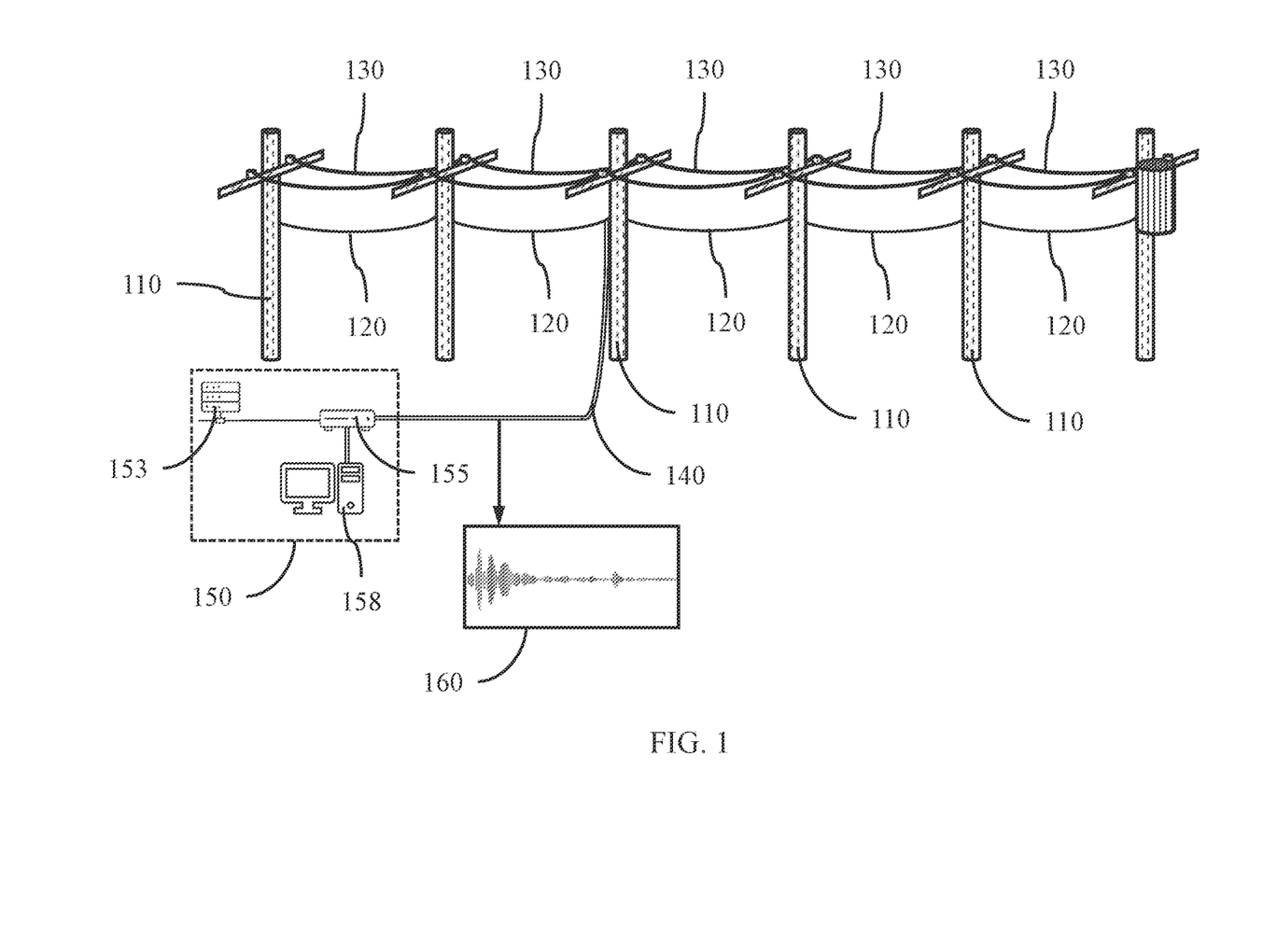
FIG. 1 is a high-level system/method for detecting field work on utility poles and avoiding scheduling conflicts in real time is illustratively depicted in accordance with an embodiment of the present invention.

Referring now in detail to the figures in which like numerals represent the same or similar elements and initially to FIG. 1, a high-level system/method for detecting field work on utility poles and avoiding scheduling conflicts in real time is illustratively depicted in accordance with one embodiment of the present invention.

In one or more embodiments, fiber optic cables 120 including one or more optical fibers can be strung on utility poles 110. Electrical power lines 130 can also be strung on the same utility poles 110. A fiber optic tap 140 can be connected to and in optical communication with at least one of the one or more optical fibers making up the fiber optic cable 120. The fiber optic tap 140 can connect to a distributed acoustic sensing (DAS) system 150, where the fiber optic tap 140 can communicate a raw vibrational signal 160 from the optical fiber to the distributed acoustic sensing (DAS) system 150 for analysis.

In various embodiments, external sensors other than the optical fibers and fiber optic tap 140 are not used to measure and obtain vibration signals.

In various embodiments, the vibration signal 160 obtained by the DAS system 150 is a raw signal from the utility pole(s) at which work is being performed. The instant vibrations caused by the field activities result in a time-varying phase shift, which can be directly detected and localized by the distributed acoustic sensing system (DAS) 150. A vibration sensing system 155 can detect and measure dynamic strain changes along the optical fiber by detecting the optical phase shifts of received backscattered light relative to the optical local oscillator.

The collected vibrational signal(s) 160 after preprocessing can be fed into a machine learning model 153 of the DAS system 150 for events classification, which can identify which company/party is on site performing the work from the vibrational patterns.

Figure 2:
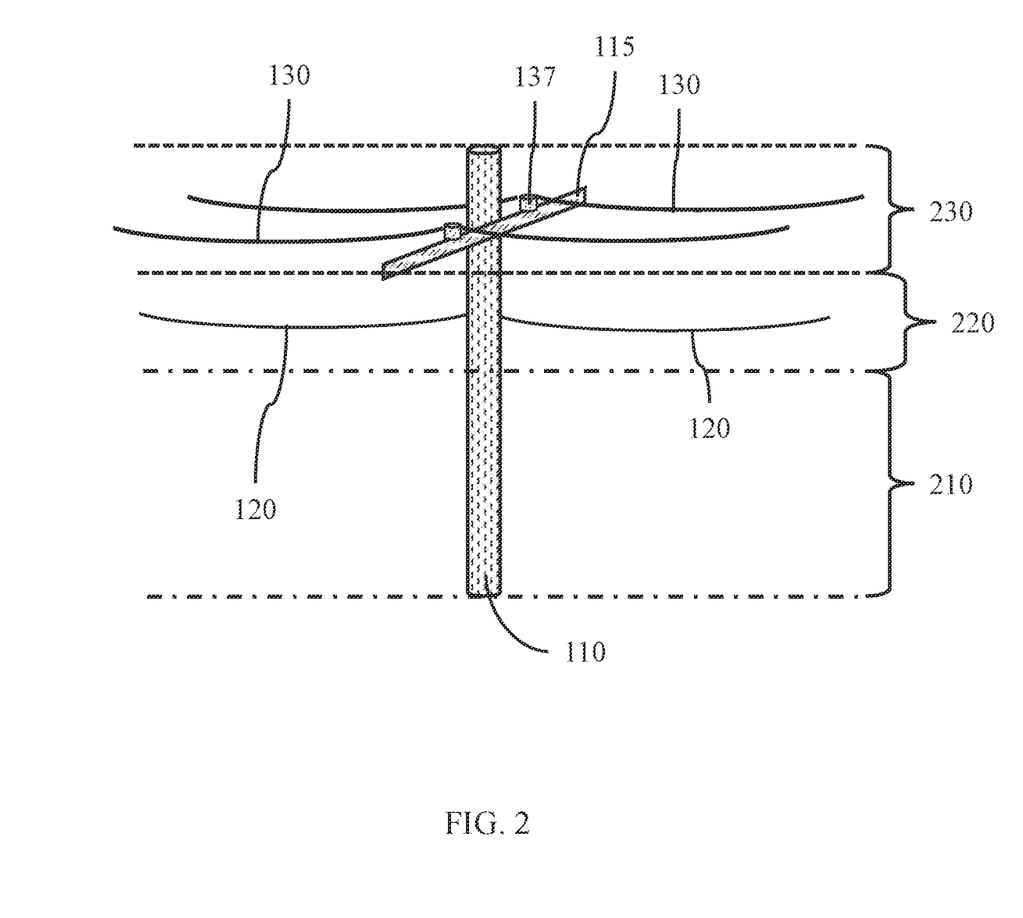
FIG. 2 is a diagram illustrating utility pole regions, in accordance with an embodiment of the present invention.

Referring now to FIG. 2, regions of a utility pole are illustratively depicted in accordance with an embodiment of the present invention.

In one or more embodiments, a utility pole 110 can have multiple work zone regions, including a lower support region 210, a telecommunications region 220, and an electrical power distribution region 230. The telecommunications region 220 can include the fiber optic cables 120, as well as other telecommunications components, that facilitate transmission of light and electrical communication signals. The electrical power distribution region 230 can include power lines, such as copper electrical cables, as well as other electrical components, such as transformers and insulators 137, for distribution of electrical energy to homes, businesses, industries, and other facilities and locations. The lower support region 210 can be the main structural member of the utility pole that supports the telecommunications region 220 and electrical power distribution region 230. The lower support region 210 can be implanted into the ground to secure its position. The electrical power distribution region 230 can include cross-arms 115 that support the electrical power lines 130, whereas the telecommunications region 220 can have fiber optic cables 120 attached to or strung through the utility pole 110.

Different work performed on a utility pole presents different vibrational patterns, as well as vibrational levels and lasting time (i.e., duration) that can be identified as vibrational features. For example, a pole inspector hammering the pole usually starting near the ground line and continuing upwards circumferentially around the pole to a height of approximately 6 feet in the lower support region 210. The hammer will produce a unique vibrational pattern. While under other circumstances, an electrician working on a height above 20 feet or at a height up to the top of a pole in the electrical power distribution region 230, can produce a different vibrational pattern in the pole and fiber optic cables 120 compared with the vibration pattern induced between 6 feet to 20 feet in the telecommunications region 220.

In various embodiments, a distributed acoustic sensing (DAS) system 150 is used to collect the real-time vibrational signal 160 when field work is performed, and the duration of the vibrational signal is recorded simultaneously. The collected vibrational signal after preprocessing can be fed into a machine learning model 153 for events classification, which can identify which company/party is performing the work from one or more features of the real-time vibrational signal 160.

The vibrational signal 160 can include one or more of the following: ambient vibrations and background noise, vibrations from the lower support region 210, which may be caused by utility pole inspection, vibrations from the telecommunications region 220, which may be caused by telecommunications and optical cable replacement and/or repair, and vibrations from the electrical power distribution region 230, which may be caused by electrical power line and component replacement and/or repair.

Identifying the working zone can be a multi-class classification problem, where the number of parties to be predicted is more than two. The neural network can learn which operations produce which vibrational signals from the different regions of the utility pole, where a Random Forest Classification function can be used, where the output of the random forest model is the class selected by most of the decision trees. A decision tree is a flowchart-like structure in which each internal node represents a "test" on an attribute, where each branch represents the outcome of the test, and each leaf node represents a class label (decision taken after computing all attributes). The paths from root to leaf represent classification rules. Multiple trees can be used to test different attributes and classify the vibrational signal based on the outcomes of the different tests. A supervised learning technique can be used to train the neural network. Knowledge of the type of field work being conducted and the duration of the field work at the time of receiving the signal can be used to label the training data for training the neural network on the vibrational features.

Figure 3:
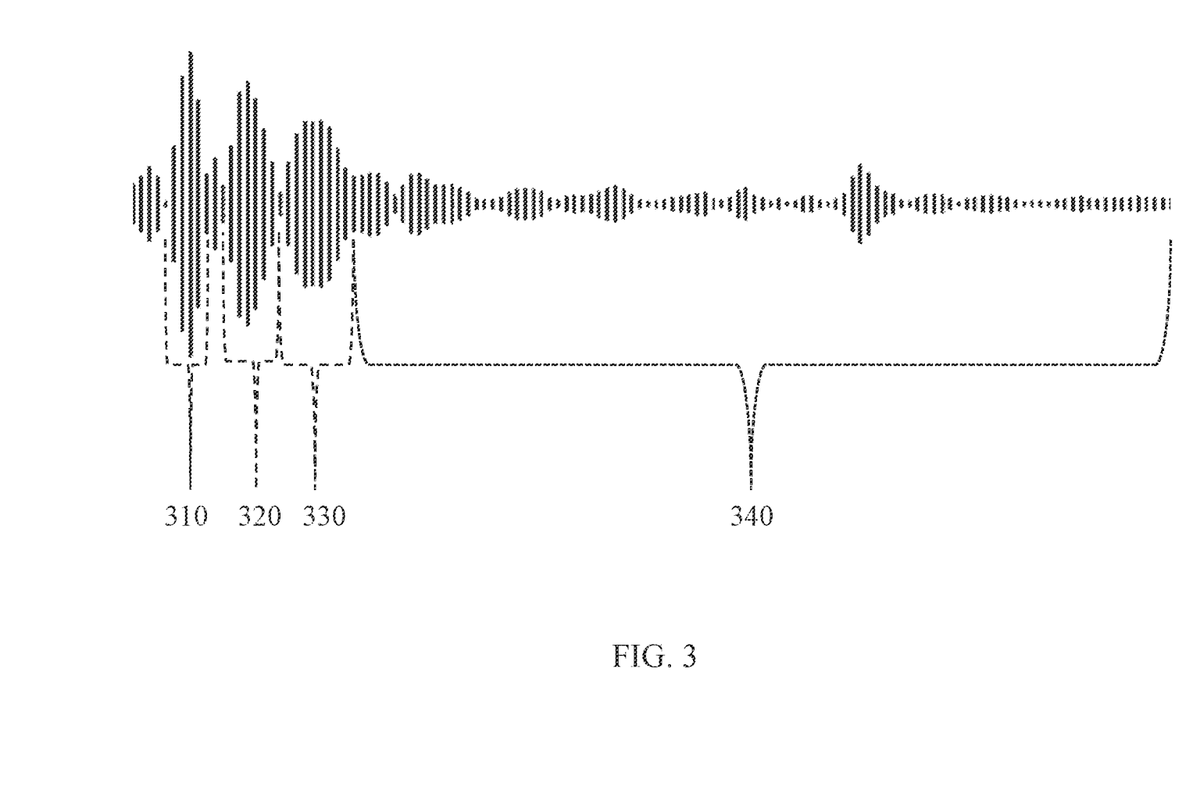
FIG. 3 is a diagram illustrating a vibrational signal from optical fiber phase shifting relating to utility pole field work, in accordance with an embodiment of the present invention.

Referring now to FIG. 3, a vibrational signal from optical fiber phase shifting relating to vibrational events from utility pole field work are illustratively depicted in accordance with an embodiment of the present invention.

In one or more embodiments, a vibrational event 310, 320, 330, as distinguished from background/inherent (noise) vibrations 340 (e.g., adjacent traffic and/or environmental conditions), can occur at a utility pole 110. Each vibrational event 310, 320, 330 can have a fingerprint which can classify the position of the vibrational event 310, 320, 330 on the utility pole, and a duration of the vibrational event.

Figure 4:
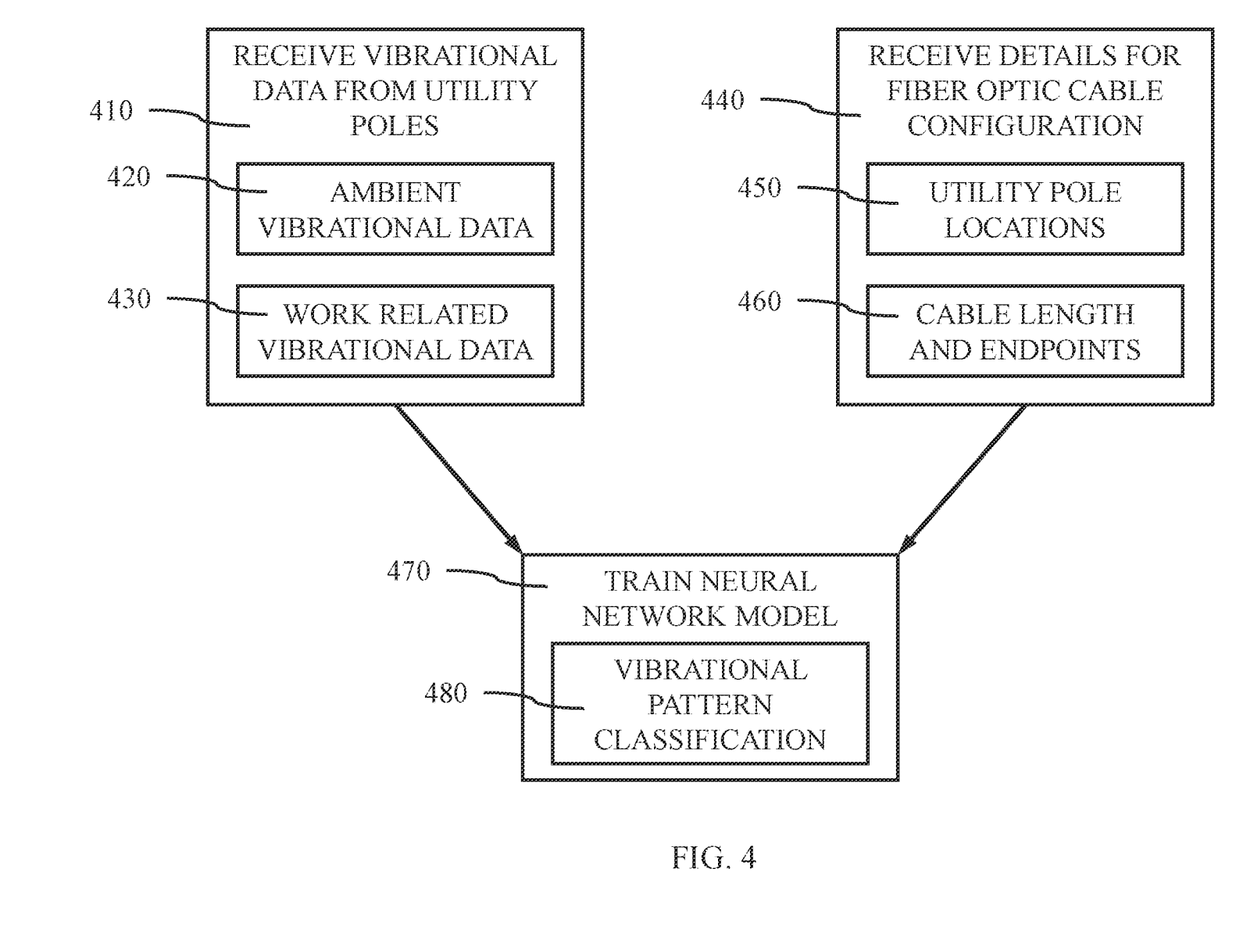
FIG. 4 is a block/flow diagram illustrating a system/method for training a neural network to detect and classify vibrational signals, in accordance with an embodiment of the present invention.

FIG. 4 is a block/flow diagram illustrating a system/method for training a neural network to detect and classify vibrational signals, in accordance with an embodiment of the present invention;

In one or more embodiments, vibrational data can be received 410 from the utility poles, where the vibrational data can include ambient vibrational signal data 420, for example, that caused by adjacent traffic and/or environmental conditions (e.g., construction site, cement factory, etc.), and work-related vibrational signal data 430 from actual work conducted on the utility pole(s) 110. Field work may be identified at more than one utility pole based on the location information and vibrational signal features.

In one or more embodiments, geolocation of the utility poles and fiber optic cable spans that identify the configuration 440 of the utility plan can be received. The data regarding the fiber optic cable configuration can include cable length and endpoints 460, where the vibrational signals may be interrupted, attenuated, or otherwise modified in a manner that prevents data gathering of vibrational signals beyond the defined connection or end points. The data can include the GPS locations 450 of each of the utility poles in the monitored configuration 440 to allow location identification. The fiber optic cable lengths can be attached to the utility poles in a specific order that defines a fiber optic path between the utility poles that a vibrational signal would traverse. The DAS system enables sensing from already-strung/laid optical fibers for communication.

In various embodiments, all of the data can be inputted into the neural network (NN) to train the model 470 to identify the particular vibrational patterns for subsequent classification 480 in real time for field work generating different vibrational signals.

In one or more embodiments, a random forest classification model can be trained and used. The random forest model works with data in a table format, which is the ensemble of decision trees. Each decision tree, in the ensemble, processes the sampling data and predicts the output label (i.e., classification), in this case, the "working zones." Decision trees in the ensemble are independent and each can predict a final response.

For each decision tree, the importance of a node based on Gini importance can be calculated.

$$ni_j = w_j C_j - w_{left(j)} C_{left(j)} - w_{right(j)} C_{right(j)};$$

Where: $ni_j$: is the importance of node j;
$w_j$: is a weighted number of samples reaching node j;
$C_j$: is the impurity value of node j;
left(j): is the child node from a left split on node j;
right (j): child node from right split on node j.

The sum of the feature's importance value on each tree can be calculated and divided by the total number of trees:

$$RF f_{i_i} = \frac{\sum_{j \in all\ trees} norm\ fi_{ij}}{T};$$

Where: $RF\ f_{i_i}$ is the importance of feature i calculated from all trees in the model, $normfi_{ij}$ is the normalized feature importance for i in tree j, and T is the total number of trees.

In various embodiments, the duration of a received vibrational signal can be determined and analyzed, where duration and intensity can be features of the vibrational signal.

In various embodiments, the utility pole GPS location can be determined and analyzed, where the GPS location can be relative to a distance along the optical fiber from the distributed acoustic sensing (DAS) system 150. The starting and ending points of the fiber along a telecommunication route can be known prior to receipt and analysis of a vibrational signal.

In various embodiments, the GPS locations of the utility pole can be obtained from the companies who own the pole(s) such as a utility company. The GPS locations may be determined when the poles were installed. The GPS information thus can be preloaded to a graphical user interface (GUI) 158 which is a part of the DAS system 150. Or if not using GPS location(s), the distance in terms of the fiber length can be used by performing a hammer test on the pole. For example, when a utility pole is hammered, the vibration propagates from the pole to the optical fiber (in two directions) which makes a "V" shape. In a waterfall image from the DAS 150, the location corresponding to the tip of the "V" is the location of that pole in terms of fiber length. This distance or location is different from the GPS location which is not dependent on the fiber length.

Figure 5:
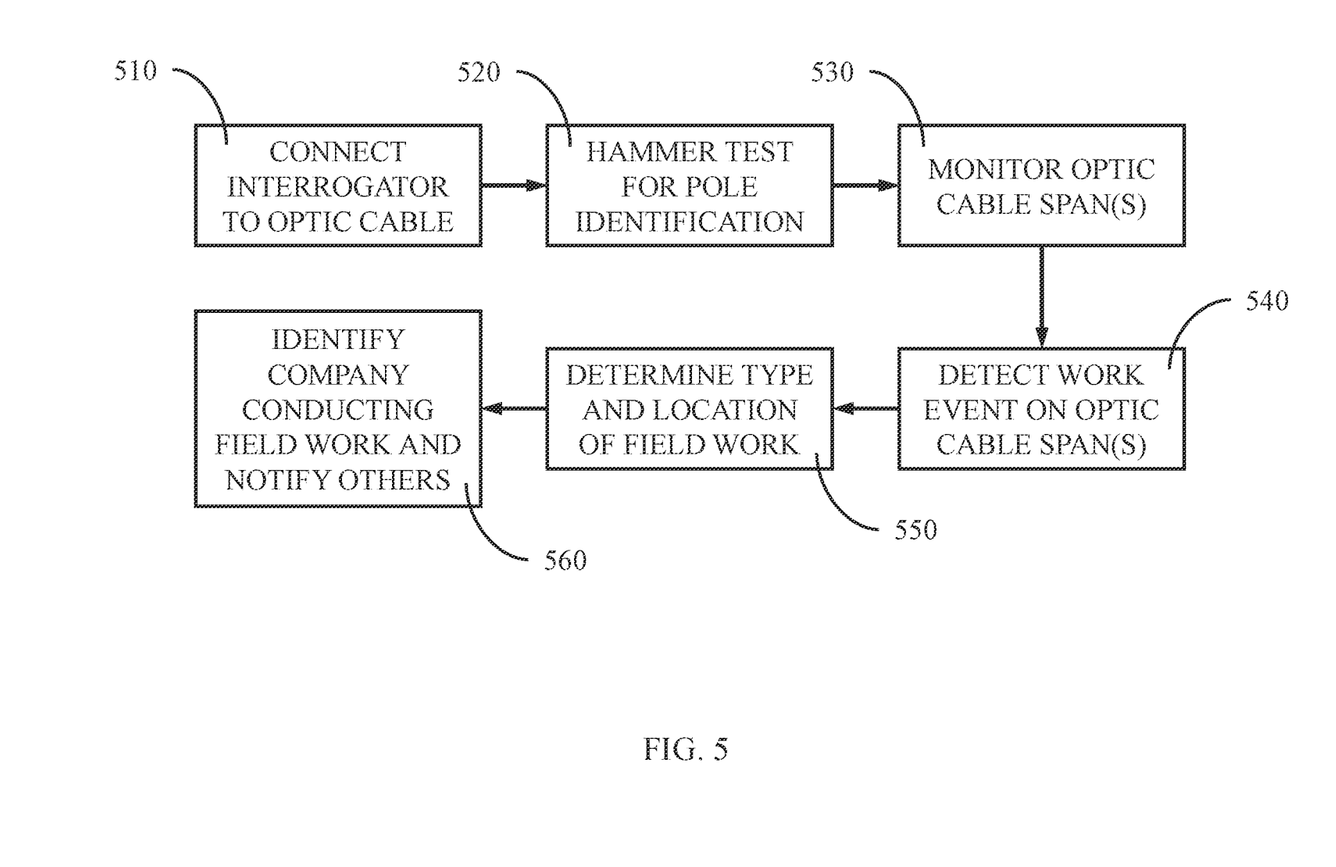
FIG. 5 is a block/flow diagram illustrating a method of detecting and classifying field work on utility poles, in accordance with an embodiment of the present invention.

FIG. 5 is a block/flow diagram illustrating a method of generating data for detecting and classifying field work on utility poles, in accordance with an embodiment of the present invention.

At block 510, a fiber optic tap 140 can be connected to and in optical communication with at least one of the one or more optical fibers making up the fiber optic cable 120. The fiber optic tap 140 can connect the vibration sensing system 155 to the optical fiber of the fiber optic cable 120.

At block 520, a controlled vibrational signal can be generated by a user by performing a hammer test on a lower support region 210 of a utility pole to provide an identifying and labeled signal for training the NN.

At block 530, the optical cable spans can be monitored to receive the controlled vibrational signal using the interrogator and fiber optic tap 140. The optical cable span can be between two endpoints.

At block 540, the interrogator can detect the vibrational signal and related field work from the optical cable span.

At block 550, the interrogator can determine the type and location of the field work from the vibrational signal using the trained neural network model.

At block 560, the type and location of the field work can be used to identify the company doing the field work, and other parties having an interest in the field work at the identified location can be notified. The other notified parties can then communicate with their field crews to reschedule maintenance away from the location of the detected field work.

Step 1: Connect the DAS system to the aerial fiber optic cable, for example, with a fiber optic tap 140, and collect the strain signal along the target route.

Step 2: Conduct a hammer test on each of the poles for pole identification and localization. In this step, the GPS location of the pole sending a signal is recorded and can be uploaded to the cloud.

Step 3: Connect the distributed fiber sensing interrogator to the route of interest and start monitoring the route.

Step 4: When an event is detected by the machine learning model, the system automatically extracts the raw data (vibration signal) with the starting time of the event. The vibration signal can be monitored until the event ends. Simultaneously, the GPS location of the pole can be transferred from the cloud database.

Step 5: The extracted raw data (vibration signal) from Step 4 is feed into the machine learning model for prediction.

Step 6: The machine learning model identifies which company is performing the work. The system continuously monitors the event and until it ends. The total length of the event is recorded.

Figure 6:
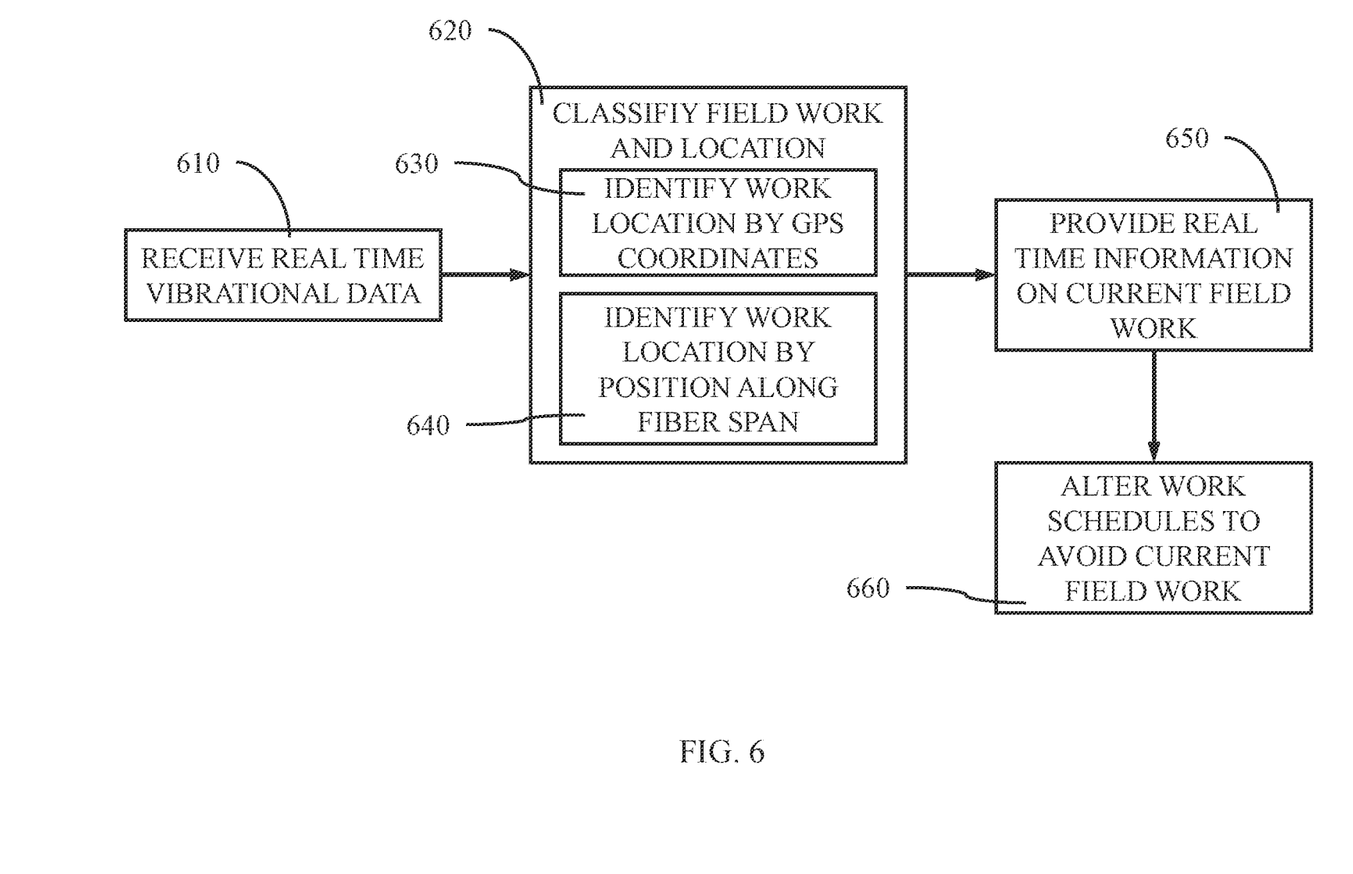
FIG. 6 is a block/flow diagram illustrating a method of avoiding conflicting scheduling of field work on utility poles, in accordance with an embodiment of the present invention.

FIG. 6 is a block/flow diagram illustrating a method of avoiding conflicting scheduling of field work on utility poles, in accordance with an embodiment of the present invention.

In one or more embodiments, at block 610, the interrogator can receive real time vibrational data from a section of utility poles having optical fiber cable(s). The distributed fiber sensing interrogator collects the real-time vibrational signal caused by the field work activity from utility poles.

At block 620, the neural network model of the interrogator can classify the type of field work being conducted and the location of the field work based on the locations of the utility poles and received vibrational signal. The location of the utility pole(s) and field work can be identified by GPS coordinates 630. The work location can also be identified 640 by a position along the fiber optic cable span from the interrogator.

At block 650, the real time field work information can be provided to the user of the interrogator.

At block 650, the information can be used by the user to alter work schedules, or the information can be sent to other parties with an interest in the field work to reschedule their maintenance to avoid the current field work.

Figure 7:
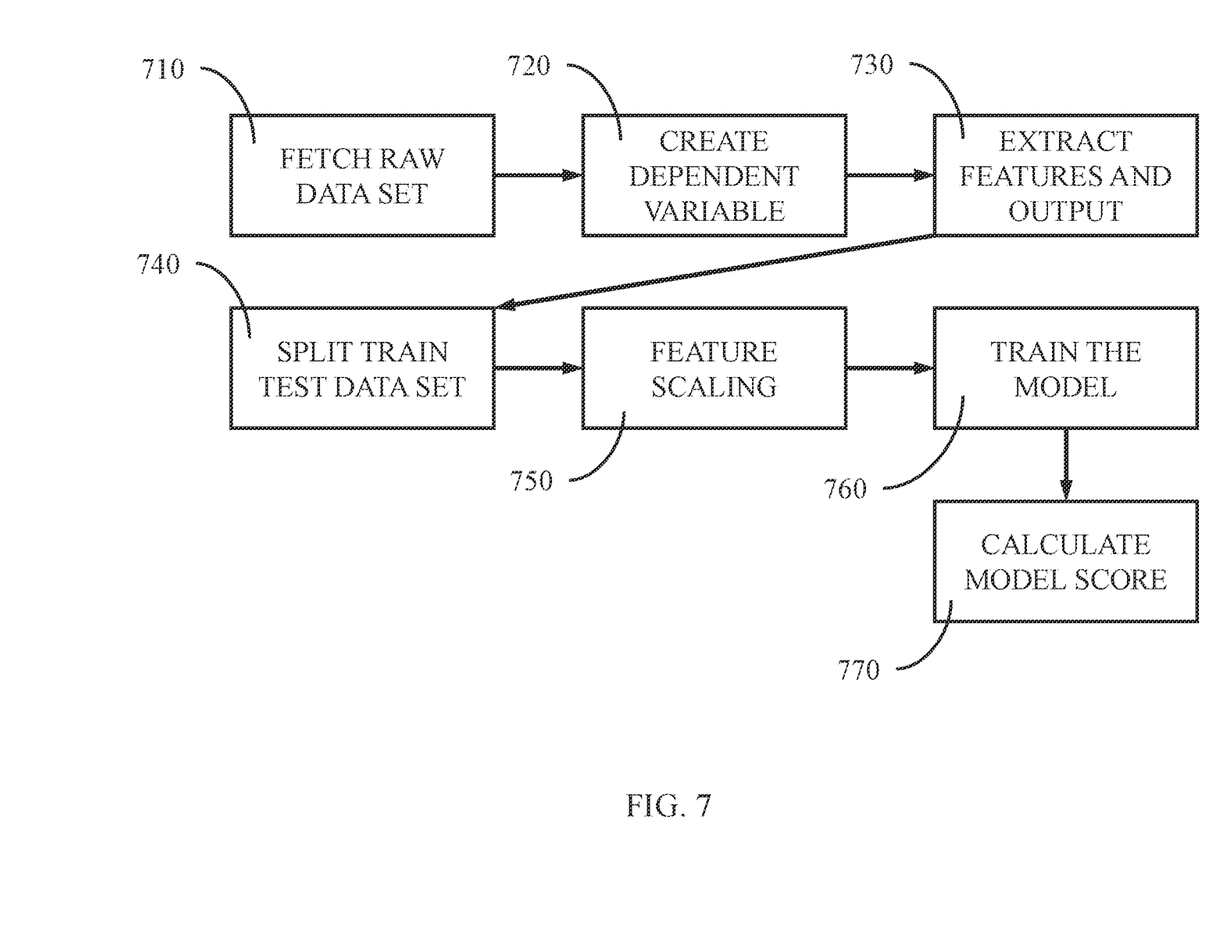
FIG. 7 is a block/flow diagram illustrating a random forest model implementation, in accordance with an embodiment of the present invention.

FIG. 7 is a block/flow diagram illustrating a random forest model implementation, in accordance with an embodiment of the present invention.

At block 710, "Fetch the raw dataset": the raw DAS vibration signal can be stored in the cloud or a local machine.

At block 720, "Create the dependent variable class": since a Random Forest can only predict numbers, the working zone values are converted, for example, from "pole_inspection", "telecom", "electric" to [0, 1, 2].

At block 730, "Extract features and output": in this step, the dataset can be split into independent and dependent variables. In a dataset, the first three columns are independent variables (amplitude, duration, frequency), representing features of the vibrations, whereas the last column, "working_zones", is the dependent variable, and these values are converted from a data frame to an array for future use.

At block 740, "Split train-test data": since the data is sufficiently high, 80% of the data can be used for training and the remaining 20% can be used as test data.

At block 750, "Feature scaling": a standard scaler that subtracts the mean value of the observation and then divides it by the unit variance of the observation can be used.

At block 760, "Train the model": in this step, we define the parameters for the random forest training. For example, we can define 5 trees in our random forest; define the loss function to measure the quality of the split, and define the seed to randomize the dataset. Finally, we use both the dependent and independent datasets to train the random forest.

At block 770, "Calculate the model score": the "working_zone" class of the test data can be predicted using the test feature set. The feature set is an x*3 matrix that contains the features of vibration signals from different working zones. The x is a user-defined sensing points/nodes along the cable. For example, in our case, we can define x=5, which means that we extract 5 points from the fiber cable (120 as shown in FIG. 1) as sensing nodes. These vibration data collected from the sensing nodes represent the vibration signal, which is obtained from DAS system. In this way, we do not need to consider huge vibrational data from the entire fiber cable. We use the prediction function of the random forest classifier to predict classes. Then, we convert the numeric classes of the predicted values and the actual test values into a textual equivalent. The performance of the classifier was evaluated using a Confusion Matrix. To get even more insight into the random forest performance, other metrics like precision, recall, and F1 score, can also be examined.

Figure 8:
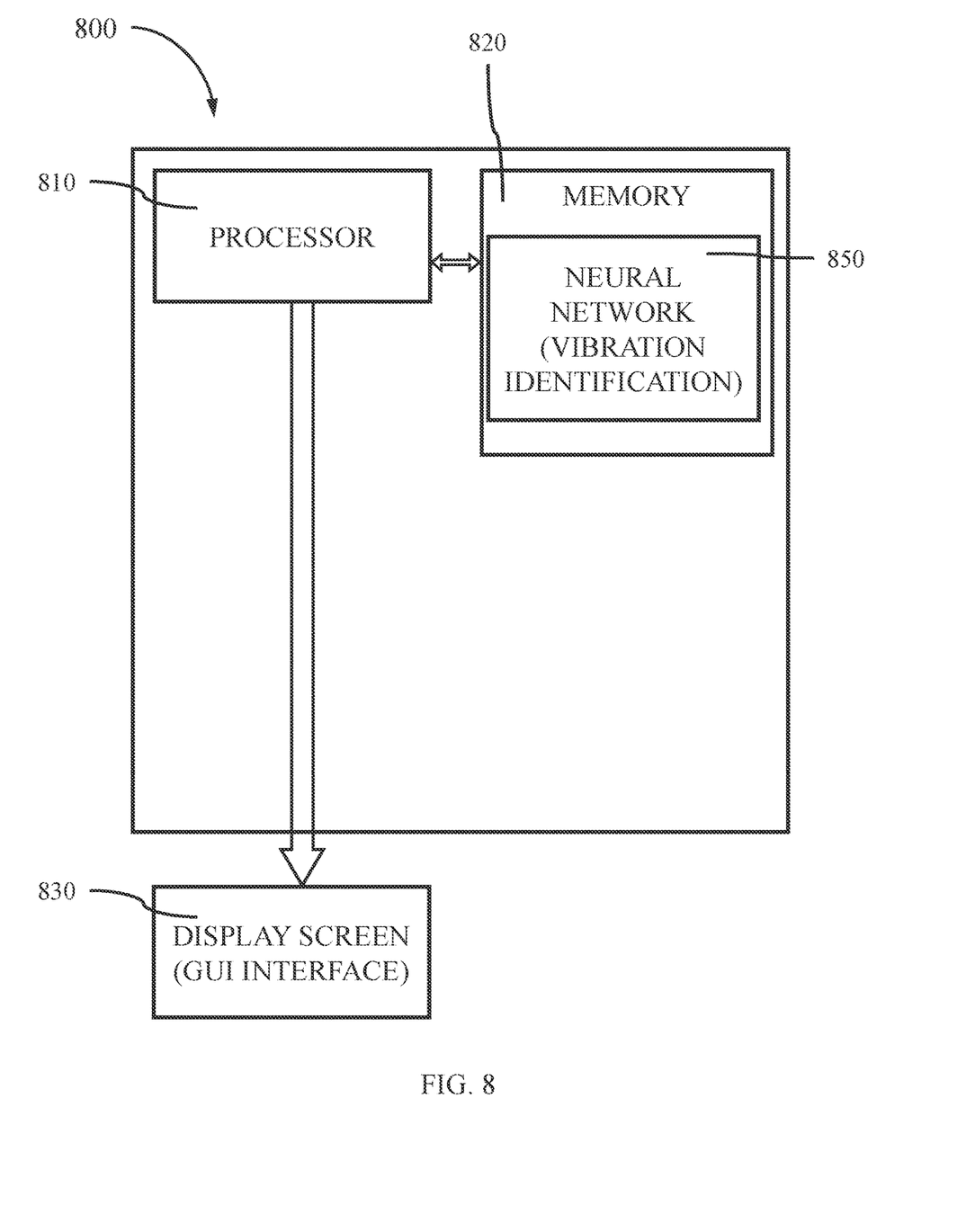
FIG. 8 illustrates a computer system for vibration identification, in accordance with an embodiment of the present invention.

FIG. 8 illustrates a computer system for vibration identification, in accordance with an embodiment of the present invention.

In one or more embodiments, a distributed acoustic sensing (DAS) system 150 can include a vibration identification system 800 for detecting and measuring dynamic strain changes having one or more processors 810. The vibration identification system 800 can include central processing units (CPUs), graphics processing units (GPUs), and combinations thereof, a computer memory 820 in electronic communication with the one or more processors 810, where the computer memory 820 can be random access memory (RAM), solid state drives (SSDs), hard disk drives (HDDs), optical disk drives (ODD), etc., and a display screen 830 configured to present a graphical user interface (GUI) 158. The memory 820 can be configured to store trained neural network(s) for vibration identification 850. The memory 820 and one or more processors 810 can be in electronic communication with a display screen 830 over a system bus and I/O controllers, where the display screen 830 can identify a company conducting field work, present work schedule conflicts, and provide notifications to alter work schedules to avoid concurrent field work at utility poles.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for reducing work conflicts, comprising:
   receiving a vibrational signal from a utility pole;
   identifying a location and type of field work on the utility pole from one or more features of the vibrational signal utilizing a trained neural network; and
   communicating the location and type of field work to a third party.

2. The method as recited in claim 1, wherein the vibrational signal includes optical phase shifts of backscattered light relative to a local optical oscillator.

3. The method as recited in claim 2, wherein the vibrational signal is received along a fiber optic tap connected to and in optical communication with at least one of one or more optical fibers making up a fiber optic cable.

4. The method as recited in claim 3, wherein the trained neural network utilizes a Random Forest Classification model to identify the location and the type of field work.

5. The method as recited in claim 4, wherein the Random Forest Classification model outputs a working zone value that identifies a work zone region on a utility pole.

6. The method as recited in claim 5, further comprising the third party altering a work schedule based on the received location and type of field work being conducted on the utility pole.

7. The method as recited in claim 5, wherein the identified work zone region is a lower support region, telecommunications region, or electrical power distribution region.

8. A system for reducing work conflicts, comprising:
a distributed acoustic sensing (DAS) system, including a vibration sensing system configured to detect and measure dynamic strain changes along an optical fiber received as a vibrational signal from a utility pole, a trained neural network configured to identify a location and type of field work from one or more features of the vibrational signal, and a graphical user interface (GUI) configured to display the dynamic strain changes to a user as a vibrational pattern and communicate the location and type of field work to a third party.

9. The system as recited in claim 8, wherein the vibrational signal includes optical phase shifts of backscattered light relative to a local optical oscillator.

10. The system as recited in claim 9, wherein the vibrational signal is received along a fiber optic tap connected to and in optical communication with at least one of one or more optical fibers making up a fiber optic cable.

11. The system as recited in claim 10, wherein the trained neural network utilizes a Random Forest Classification model to identify a location and a type of field work being done on at least one of a plurality of utility poles.

12. The system as recited in claim 11, wherein the Random Forest Classification model outputs a working zone value that identifies a work zone region on the at least one of the plurality of utility poles.

13. The system as recited in claim 12, wherein the GUI interface provides the location and type of field work to the third party in real time.

14. The method as recited in claim 13, wherein the identified work zone region is a lower support region, telecommunications region, or electrical power distribution region.

15. A non-transitory computer readable storage medium comprising a computer readable program for reducing work conflicts, wherein the computer readable program when executed on a computer causes the computer to perform the steps of:
identifying a location and type of field work on at least one of a plurality of utility poles from one or more features of a received vibrational signal utilizing a trained neural network; and
communicating the location and type of field work to a third party.

16. The computer readable program as recited in claim 15, wherein the received vibrational signal includes optical phase shifts of backscattered light relative to a local optical oscillator.

17. The computer readable program as recited in claim 16, wherein the vibrational signal is received along a fiber optic tap connected to and in optical communication with at least one of one or more optical fibers making up a fiber optic cable.

18. The computer readable program as recited in claim 17, wherein the trained neural network utilizes a Random Forest Classification model to identify the location and the type of field work.

19. The computer readable program as recited in claim 18, wherein the Random Forest Classification model outputs a working zone value that identifies a work zone region on a utility pole.

20. The computer readable program as recited in claim 19, wherein the identified work zone region is a lower support region, telecommunications region, or electrical power distribution region of the utility pole.

* * * * *